United States Patent [19]

Chapman et al.

[11] Patent Number: 5,052,855
[45] Date of Patent: Oct. 1, 1991

[54] METHOD AND APPARATUS FOR PROVIDING WATER FOR IRRIGATING TURF GRASS

[75] Inventors: Thomas L. Chapman, Dallas; William T. Slingerland, Denton, both of Tex.

[73] Assignee: Greenscape Pump Services, Inc., Coppell, Tex.

[21] Appl. No.: 570,912

[22] Filed: Aug. 22, 1990

[51] Int. Cl.$^5$ ............................................. E02B 13/00
[52] U.S. Cl. ................................. 405/36; 210/242.1; 405/127
[58] Field of Search ....................... 405/36, 39, 40, 52, 405/80, 127; 285/337, 363, 373, 419, 903, 175; 210/170, 242.1

[56] References Cited

U.S. PATENT DOCUMENTS

| | | | |
|---|---|---|---|
| 2,361,231 | 10/1944 | Nebolsine | 405/127 X |
| 2,597,728 | 5/1952 | Hink | 210/97 |
| 2,663,425 | 12/1953 | Haselwood | 210/242.1 |
| 2,933,051 | 4/1960 | Toulmin, Jr. | 103/262 |
| 3,782,552 | 1/1974 | Wendell | 210/242 |
| 4,092,036 | 5/1978 | Sato et al. | 285/337 |
| 4,168,091 | 9/1979 | Boomgarden et al. | 285/419 |
| 4,179,379 | 12/1979 | Mitchell | 210/242 R |
| 4,647,374 | 3/1987 | Ziaylek et al. | 210/242.1 |

FOREIGN PATENT DOCUMENTS

| | | | |
|---|---|---|---|
| 152473 | 2/1938 | Austria | 405/127 |
| 42903 | 3/1980 | Japan | 405/127 |
| 16721 | 2/1981 | Japan | 405/127 |
| 233010 | 12/1984 | Japan | 405/127 |

OTHER PUBLICATIONS

"Sectional View of Pump Station Site Plan," Pumping Systems, Inc. Apr. 13, 1982.

*Primary Examiner*—David H. Corbin
*Attorney, Agent, or Firm*—Baker & Botts

[57] ABSTRACT

Apparatus and method for providing essentially silt free water for the irrigation of turf grass areas and in particular for the irrigation of putting greens on golf courses. Flotation is provided for supporting the end of the inlet hose in a water body at a position therein below the surface of the water and above the silt located in the water body so that silt will not be ingested into the inlet hose and ultimately into the sump. The irrigation pump has its inlet end disposed in the sump so that silt deposited therein will not be carried into the irrigation system or plug the pump inlet. Coupling means is provided for joining the flexible inlet hose to the water supply pipe leading to the sump so that the flotation apparatus can be connected to existing water supply pipes or connected in new installations.

8 Claims, 2 Drawing Sheets

METHOD AND APPARATUS FOR PROVIDING WATER FOR IRRIGATING TURF GRASS

TECHNICAL FIELD OF THE INVENTION

This invention relates generally to methods and apparatus for providing water for irrigating turf grass from earthen bottomed water bodies. More particularly, but not by way of limitation, this invention relates to methods and apparatus for providing silt free water for turf grass, such as is used on golf courses, from earth bottomed water bodies that includes the use of a floating inlet head that is constantly disposed between the surface of the water body and the silt in the water body to avoid the disposition of silt onto the turf grass and onto greens in particular.

BACKGROUND OF THE INVENTION

Turf grasses are extremely expensive to install and are very difficult to maintain. Among the problems that affect the maintenance of the turf grass and of putting greens on golf courses in particular is the amount of silt that may be in the water used for irrigation. Most often, golf course irrigation is a typical example of turf grass irrigation wherein water from lakes or ponds is pumped for the purpose of irrigating the turf grass, including the putting greens. Such water bodies are generally earthen bottomed and as such have a tendency to accumulate large amounts of silt. The intake of silt into the suction pipe of the irrigation pumps results in excess wear on the pumps, plugging of pump suctions, erosion of pipes and fittings, plugging of spray heads and in the degradation of the quality of the putting surface on the green. In fact, the disposition of inordinate amounts of silt on the greens may cause the total loss of the green.

Coupled with the foregoing problems, many of the turf grass areas utilize a sump that is generally constructed from concrete and located adjacent to the water bodies from which the irrigation water is pumped. A flume or water supply pipe extends from the water body into the sump. The lower end of the irrigation pump, that is the inlet of the pump, generally is disposed in such sumps. Accordingly, it is important that the accumulation of silt be eliminated if possible and at least controlled in such sumps.

With fixed supply pipe installations, it is necessary that the inlet to the supply pipe be located as near to the bottom of the water body as is reasonable. Accordingly, as silt accumulates, the inlet ends of the water supply pipes are frequently in or even under the silt layer. Water being drawn in through the supply pipe brings the silt into the sump resulting in its entry into the pump inlet and the accumulation of silt in the sump.

Frequently, and especially during rainy seasons, the water bodies utilized for the irrigation of turf grass areas may become subjected to flooding and high currents which cause further silting and, in addition, often cause high velocity currents in the water body as they overflow through spillways and the like. Accordingly, any apparatus located in the water body must be extremely durable and capable of withstanding the high velocity currents which are occasionally encountered.

Another problem encountered with turf grass irrigation is the presence of relatively high concentrations of salt in the irrigation water. Apparently, a lower concentration of salt in the water is near the water surface. Less salt problems occur when the irrigation water is taken from the two or three feet adjacent to the surface.

A number of U.S. Patents have been issued on screened suction heads or intakes for pumps that also provide for flotation of the suction head. U.S. Pat. No. 2,597,728 issued to L. L. Hink on May 20, 1952 illustrates such a suction screen. It is noted that the suction screen is intended for use with fire hoses and is primarily to avoid the ingestion of leaves and the like from the bottom of the tank into pumps on fire trucks.

Similarly, U.S. Pat. No. 4,179,379 issued Dec. 18, 1979 to Robert D. Mitchell also describes a floating suction head or pickup nozzle that is intended for use with fire trucks. A third patent, U.S. Pat. No. 4,647,374 issued Mar. 3, 1987 to Ziaylek, et al. is for a similar device wherein the nozzle can be easily released from a floating strainer when desired. The device described in this patent is also intended for use with fire trucks and the like.

Other floating suction nozzle patents include U.S. Pat. No. 2,663,425 issued to W. E. Haselwood on Dec. 22, 1953 for a floating liquid intake for use in the oil sumps of automotive engines. U.S. Pat. No. 3,782,552 issued Jan. 1, 1974 to Steven T. Wendell describes a floating suction nozzle that is intended to prevent nonfloating debris from entering the nozzle while draining a pool pond or the like.

While each of the foregoing does in fact disclose a floating nozzle or suction head, none addresses the difficulty in irrigation of turf grasses. In particular, none address the problem of elimination of silt from an earthen bottomed water body that is used in the irrigation of turf grass in areas such as parks and golf courses. Accordingly, an object of this invention is to provide a method and apparatus that can be utilized to irrigate turf grass areas with water from which the silt has been essentially excluded.

Finally, each of the foregoing shows the flexible hose connected between a floating object in the water and a fixed object above the water. Another object of this invention is to provide a system wherein a connection point is located below the level of the float and screen, with the entire assembly (excluding the top of the float) permanently installed in the water source.

SUMMARY OF THE INVENTION

In one aspect, this invention provides a system for watering turf grass from a variable level water body having an earth bottom that includes a pump and means for driving the pump, a sump in which the inlet of the pump is located, a water supply pipe connecting the sump with the water body, an inlet hose extending from a water supply pipe and having its inlet end disposed below the surface of the water body but above the silt level therein, and a float for buoyantly supporting the inlet end of the inlet hose at the desired level.

In another aspect, this invention contemplates an improved method for watering turf grass from a variable level, earthen bottomed water body that includes the steps of buoyantly supporting the inlet end of the inlet member at a level in the water body below the surface thereof and above the silt level therein whereby said water entering the inlet end of the suction member is essentially silt free, pumping the essentially silt free water through the suction hose, and discharging the essentially silt free water onto the grass.

BRIEF DESCRIPTION OF THE DRAWINGS

The foregoing and additional objects and advantages of the invention will become more apparent as the following detailed description is read in conjunction with the accompanying drawing wherein like reference characters denote like parts in all views and wherein.

DETAILED DESCRIPTION OF THE PREFERRED EMBODIMENT

Figure 1:
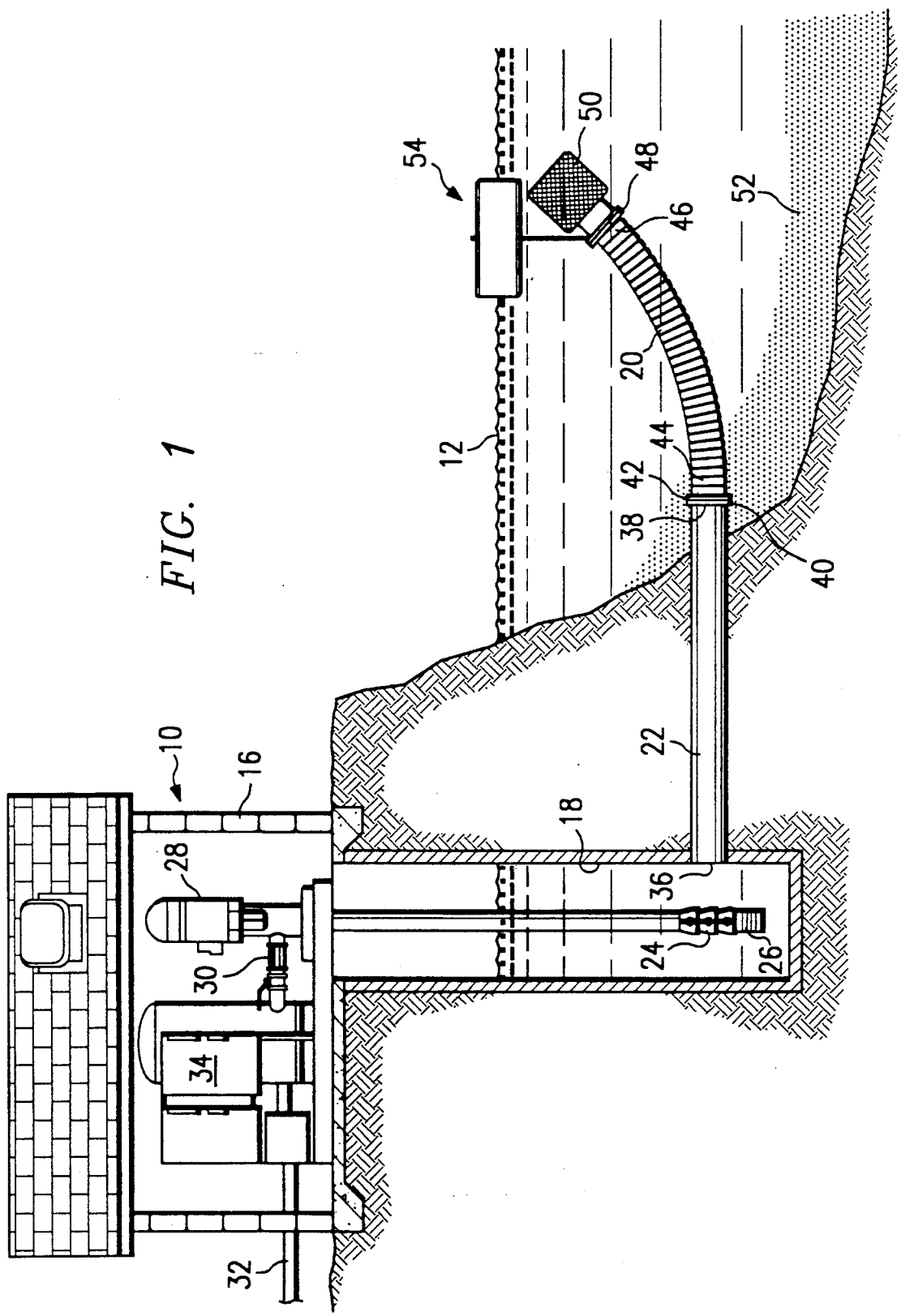
FIG. 1 is a view partially in elevation and partially in cross-section illustrating a water supply system for turf grass areas that is constructed in accordance with the invention.

Referring to the drawing and to FIG. 1 in particular, shown therein and generally designated by the reference character 10 is a system for watering golf courses from a variable level pond or water body 12 having an earthen bottom 14. The watering system 10 is generally housed in some form of protective shed 16 located near the pond 12. Extending below the shed 16 is a sump 18 that receives water from the pond 12 through an inlet hose or member 20 and a flume or water supply pipe 22.

A pump 24 has its inlet 26 located near the bottom of the sump 18. The pump 24 is driven by a motor 28 that is located in the shed 16. The outlet 30 of the pump 28 is connected with an irrigation pipe 32 through various apparatus 34 that may include filters, separators, and water treaters, as required by local laws or by necessity.

The water supply pipe 22 has an outlet 36 in fluid communication with the sump 18 and has an inlet 38 provided with a flange 40 that is arranged to mate with a flange 42 on an outlet end 44 of the inlet hose 20. The flanges 40 and 42 are connected by a plurality of threaded fasteners (not shown). The inlet hose 20 has its inlet end 46 connected by a flange arrangement 48 to a screen or strainer 50 which prevents the entrance of debris into the inlet end 46 of the inlet hose 20.

It will be noted that the inlet end 46 of the inlet hose 20 is supported at a level in the water body 12 between the surface thereof and the upper surface of the layer of silt 52 located at the bottom of the water body 12. It is important that the inlet end 46 be located in this area to avoid the movement of the silt 52 from the water body 12 into the sump 18 and consequently into the pump 24 and irrigation pipe 32. Location of the inlet end 46 is maintained at the desired position by a float assembly 54 which is shown in greater detail in FIG. 2.

Figure 2:
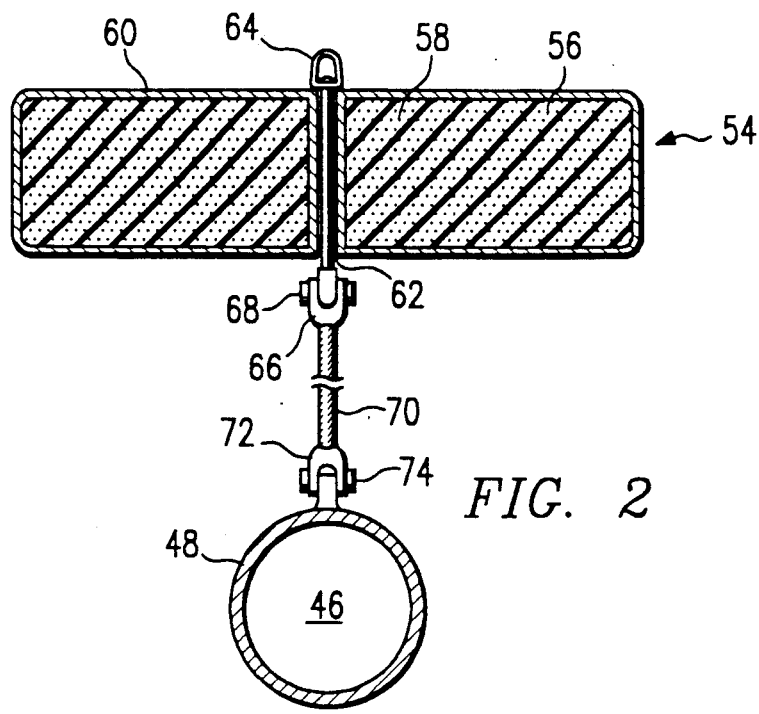
FIG. 2 is an enlarged cross-sectional view of a float arrangement utilized to support the inlet end of an inlet member in the system of FIG. 1.

As shown in FIG. 2, the float assembly 54 includes a float 56 having an inner core 58 that is constructed from a foamed plastic to provide the required buoyancy. An exterior layer 60 on the float 56 is constructed preferably from a material such as fiberglass which is much tougher than the foamed plastic inner core 58 and serves to protect the foam from weathering and engagement with logs or other debris that may float in the water body 12. The float 56 has an opening 62 that extends therethrough to receive a cable support member 64. The cable support member 64 is retained therein and is fastened to a clevis 66 by means of a pin 68. The clevis 66 supports a cable 70 which has its length determined by the distance that the inlet end 46 of the inlet hose 20 is to be positioned below the surface of the water body 12. The lower end of the cable 70 is provided with a clevis 72 which is fastened by a pin 74 to the flange arrangement 48 located on the inlet hose 20.

It is preferred that the materials used in forming the various metal components of the apparatus be composed of a material that is highly resistant to the adverse environment in which the apparatus is positioned. For example, it is preferred that the threaded fasteners, screen, and cable be constructed from stainless steel so that they will not be subjected to the corrosive characteristics of the water. The inlet hose 20 needs to be relatively flexible but should be extremely durable and is preferably a wire wound hose. The wire winding should be of steel and of adequate size to prevent collapse of the hose should the screen 50 be partially obstructed. Also, the hose 20 must be sufficiently strong to withstand the pounding that may occur in water bodies that are subject to flooding as previously mentioned.

OPERATION OF THE PREFERRED EMBODIMENT

With the motor 28 in operation, the pump 24 is driven to lift water from the sump 18 through the pump outlet 30 and into the outlet pipe 32. Since the strainer 50 and inlet end 46 of the inlet hose 20 are located well above the silt 52 in the water body 12, water entering the inlet end 46 of the inlet hose 20 flows through the water supply pipe 22 into the sump 18 without carrying silt thereinto, thus assuring that silt does not accumulate in the sump 18 to be pumped onto the golf course or, perhaps, block the inlet 26 of the pump 24.

As the level of the water changes, the float assembly 54 continually positions the inlet 46 of the inlet hose 20 at a fixed distance below the surface of the water. It will, of course, be necessary for the operator of the system to notice that the level of water in the water body 12 has dropped t the point that the inlet end 46 of the inlet hose 20 may be located in the silt 52. If this occurs, appropriate precautions must be taken such as shortening the cable 70. Shortening of the cable 70 raises the inlet end 46 closer to the surface of the water and the water level can be lower before the inlet end 46 is located in the silt 52.

In very low elevation areas, such as in Florida, a considerable amount of salt is usually present in the water bodies. In such installations, the inlet 46 will be located in the upper two or three feet of the water to ingest the minimum salt into the system.

As described in connection with the apparatus of FIG. 1, the inlet end 38 of the water supply pipe 22 is connected to the outlet end 44 of the inlet hose 20 by flanges 42 which are held together with threaded fasteners (not shown). Such an arrangement is the ideal situation because it provides the greatest strength of connection between the inlet hose 20 and the water supply pipe 22.

However, there are many situations where the water supply pipe 22 is already installed and it is necessary to provide some form of connector or adapter to join the inlet hose 20 and the water supply pipe 22. Two such modified coupling arrangements are illustrated in FIGS. 3 and 4.

MODIFICATION OF FIG. 3

Figure 3:
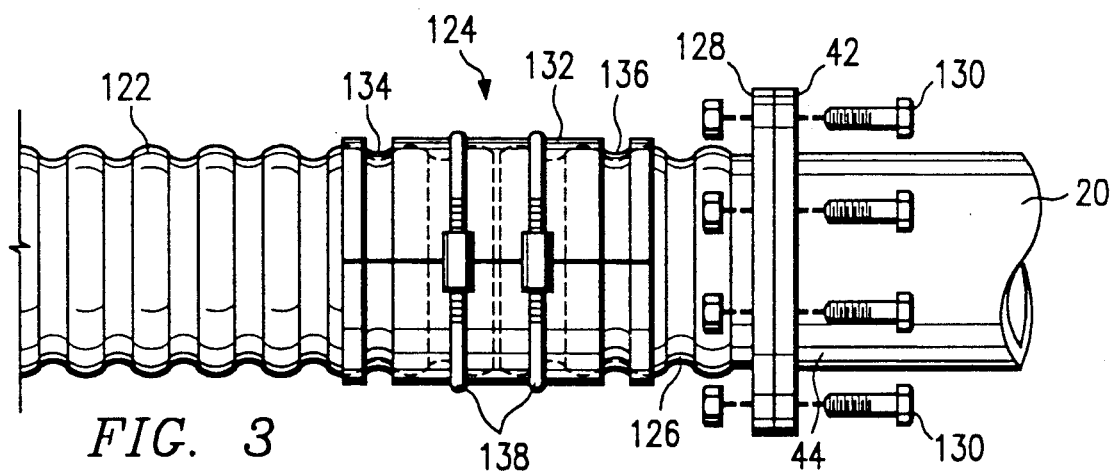
FIG. 3 is an enlarged fragmentary view illustrating one type of coupling used in the system of FIG. 1.
Figure 4:
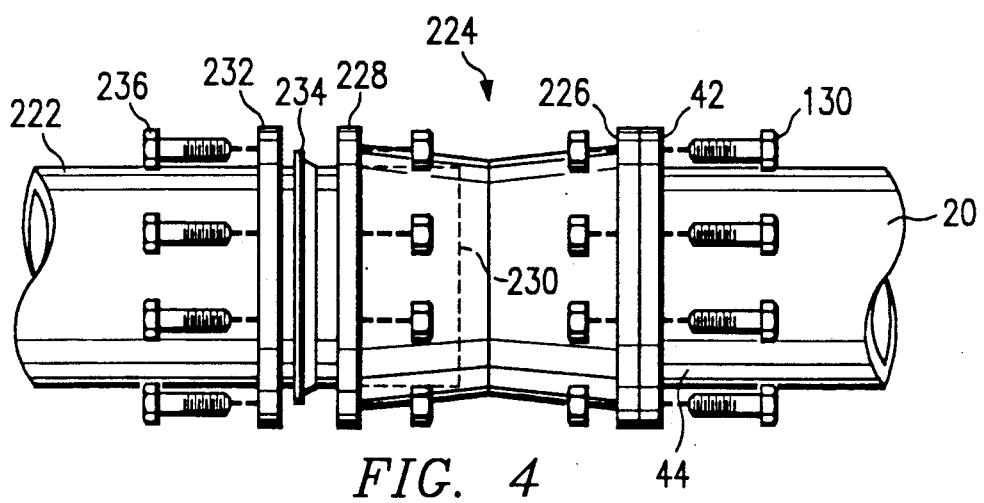
FIG. 4 is a fragmentary view illustrating still another type of coupling that is used in the invention of FIG. 1.

In the illustration of FIG. 3, the water supply pipe 122 has corrugation on its exterior. The inlet end of the water supply pipe 122 has already been positioned in the water body 12. In order to connect the flange 42 located on the outlet end 44 of the inlet hose 20 thereto, a connector assembly or adapter, generally designated by the reference character 124, is utilized.

The connector assembly 124 includes a section of corrugated pipe 126 having a flange 128 mounted thereon. The flange 128 is designed to mate with the flange 42 located on the inlet hose 20. A plurality of threaded fasteners 130 are provided to connect the flanges 42 and 128. The fasteners are illustrated in an exploded view in FIG. 3.

The connector assembly 124 also includes a split sleeve 132 that has interiorly extending convex annular portions 134 and 136 sized and designed to enter the corrugations on the exterior of the water supply pipe 122 and on the corrugated pipe section 126.

Accordingly, and with the split sleeve 132 installed over the ends of the pipe section 126 and over the water supply pipe 122, those sections are prevented from moving relatively apart. To make certain that they cannot become separated, banding clamps such as illustrated at 138 are placed over the split sleeve 132. Appropriate seals (not shown) are provided as required in the interior of the split sleeve 132 as it is assembled with the corrugated pipe section 126 and the corrugated water supply pipe 122.

MODIFICATION OF FIG. 4

FIG. 4 illustrates another arrangement for connecting the inlet hose 20 with a water supply pipe 222 which has a relatively smooth cylindrical exterior. The arrangement includes a connector adapter or assembly 224 which has flanges 226 and 228 located on the ends thereof. The flange 226 is sized and arranged to mate with the flange 42 located on the outlet end 44 of the inlet hose 20 to connect the adapter 224 to the inlet hose 20. As can be seen in FIG. 4, a plurality of thread fasteners 130 (shown in exploded view) are provided for the purpose of connecting the flanges 42 and 226.

The interior of the connector member 224 is sized to receive the end 230 (shown in dashed line) of the water supply pipe 222. A gland 232 that is sized to slip over the exterior of the water supply pipe 222 is positioned on the water supply pipe 222 adjacent to the flange 228.

Located between the flange 228 and gland 232 is a resilient seal and gripping member 234. The member 234 is deformed when threaded fasteners 236 are tightened moving the flange 228 and gland 232 toward each other. The deformation of the member 234 provides a frictional grip with the exterior of the water supply pipe 222 and forms a seal therewith.

The use of the connector assemblies 124 and 224 in conjunction with the apparatus 10 provide means for securing the outlet end 44 of the inlet hose 20 to the water supply pipe 122 or 222 in a manner so that the inlet hose 20, despite the battering it may receive in flooded conditions of the water body 12, will remain intact. Manifestly, the use of such couplings provides a mean for equipping preexisting turf grass water supply systems, such as golf course systems, with apparatus to prevent the induction of silt into the water supply.

It will be apparent from viewing FIG. 1 that the silt 52 can and will build up over the inlet end 38 of the water supply pipe 22 and, in the case of the prior known installations, a screen would be attached to the flange 40. Such a screen would be effective to prevent debris from entering the water supply pipe 22 but would be ineffective to prevent the entrance of silt therein. Consequently, the silt will enter the sump 18 and eventually be deposited onto the turf grass.

It will be understood that the embodiments described in detail hereinbefore are presented by way of example only and that many changes and modifications can be made thereto without departing from the spirit or scope of the invention.

What is claimed is:

1. A system for providing water for turf grass areas and preventing the disposition of silt thereon from a variable level water body having an earthen bottom, the system comprising:

a water pump having an inlet and an outlet;
   means for driving the pump;
   water distribution means connected to the outlet of said pump for delivering water from said water body to said turf grass areas;
   a sump located remote from said water body and having the pump inlet disposed therein;
   a fixed water supply conduit having an inlet end in the said body and an outlet end in said sump connecting said sump and water body;
   a flexible inlet member having an inlet end suspended a predetermined distance below the surface of the water in said water body and located above silt disposed therein and having an outlet end connected to said water supply conduit for providing water free of silt from said water body to said sump;
   connecting means for joining the outlet end of said flexible inlet member to the inlet end of said water supply conduit; and
   float means in said water body for buoyantly supporting the inlet end of said inlet member.

2. The system of claim 1 and also including a screen covering the inlet end of said inlet member to prevent the entrance of debris into said inlet member.

3. The system of claim 1 wherein said float means includes:

a buoyant member for supporting the inlet end of said inlet member; and a replaceable, flexible support member connecting the inlet end of said inlet member to said buoyant member.

4. The system of claim 3 wherein said buoyant member includes:

a foamed plastic inner core for providing buoyancy; and
   a fiberglass exterior for protecting said core.

5. A method of providing silt free water for turf grass areas from a variable level water body having an earthen bottom including the steps of:

supporting the inlet end of a flexible inlet member at a constant distance below the water surface, but above the silt level;
   delivering essentially silt free water from said water body through said inlet member into a sump; and
   pumping said essentially silt free water from the sump onto said turf grass area.

6. A system for providing water for turf grass areas and preventing the disposition of silt thereon from a variable level water body having an earthen bottom, the system comprising:

a water pump having an inlet and an outlet;
   means for driving the pump;
   water distribution means connected to the outlet of said pump for delivering water from said water body to said turf grass areas;

a sump located remote from said water body and having the pump inlet disposed therein;

a fixed water supply conduit having an inlet end in said water body and an outlet end in said sump connecting said sump and water body, said supply conduit constructed from corrugated pipe;

a flexible inlet member having an inlet end suspended a predetermined distance below the surface of the water in said water body and located above silt disposed therein and having an outlet end comprising a flange and connected to said water supply conduit for providing water free of silt from said water body to said sump;

connecting means for joining the outlet end of said flexible inlet member to the inlet end of said water supply conduit, said connecting means includes an adapter member constructed from the same size corrugated material as said supply conduit and located in end to end relationship with said supply conduit, a flange on said adapter member sized to mate with the flange on said inlet member and connected thereto, fastening means connecting said flanges, and a clamp member in holding engagement with the inlet end of said supply conduit and in holding engagement with said adapter member; and float means in said water body for buoyantly supporting the inlet end of said inlet member.

7. The system of claim 6 wherein said clamp member is split for location on said adapter member and supply conduit and said system also includes at least one banding member encircling said clamp member to retain said clamp member assembled in holding engagement with said adapter member and supply conduit.

8. A system for providing water for turf grass areas and preventing the disposition of silt thereon from a variable level water body having an earthen bottom, the system comprising:

a water pump having an inlet and an outlet;

means for driving the pump;

water distribution means connected to the outlet of said pump for delivering water from said water body to said turf grass areas;

a sump located remote from said water body and having the pump inlet disposed therein;

a fixed water supply conduit having an inlet end in said water body and an outlet end in said sump connecting said sump and water body, said supply conduit having a cylindrical exterior;

a flexible inlet member having an inlet end suspended a predetermined distance below the surface of the water in said water body and located above silt disposed therein and having an outlet end comprising a flange and connected to said water supply conduit for providing water free of silt from said water body to said sump;

connecting means for joining the outlet end of said flexible inlet member to the inlet end of said water supply conduit, said connecting means includes a generally cylindrical adaptor member having flanges on each end located on said supply conduit, one said flange sized to mate with the flange on said inlet member and connected thereto, a gland member loosely encircling said supply conduit, a deformable, annular gripping member encircling said supply conduit between the other said flange on said adapter member and said gland member, and fastening means urging said gland member and the other said flange together for deforming said grippling member into sealing and holding engagement with the exterior of said supply conduit; and float means in said water body for buoyantly supporting the inlet end of said inlet member.

* * * * *